(12) United States Patent
Delajoud

(10) Patent No.: US 6,732,596 B2
(45) Date of Patent: May 11, 2004

(54) CRITICAL GAS FLOW MEASUREMENT APPARATUS AND METHOD

(75) Inventor: Pierre R. Delajoud, Neuilly sur Seine (FR)

(73) Assignee: CalAmerica Corp., Phoenix, AZ (US)

( * ) Notice: Subject to any disclaimer, the term of this patent is extended or adjusted under 35 U.S.C. 154(b) by 15 days.

(21) Appl. No.: 10/292,919

(22) Filed: Nov. 12, 2002

(65) Prior Publication Data

US 2003/0110853 A1 Jun. 19, 2003

Related U.S. Application Data

(60) Provisional application No. 60/334,793, filed on Nov. 15, 2001.

(51) Int. Cl.[7] ................................................. G01F 1/42
(52) U.S. Cl. .................................................. 73/861.61
(58) Field of Search ........................ 73/861.61, 861.52, 73/861.01, 861.02, 861.03

(56) References Cited

U.S. PATENT DOCUMENTS

| | | | | |
|---|---|---|---|---|
| 4,484,472 A | * | 11/1984 | Licinit et al. ............ | 73/204.11 |
| 4,576,204 A | * | 3/1986 | Smallhorn et al. ............ | 138/44 |
| 4,768,384 A | * | 9/1988 | Flecken et al. .......... | 73/861.02 |
| 5,445,035 A | | 8/1995 | Delajoud ................. | 73/861.52 |

* cited by examiner

Primary Examiner—Edward Lefkowitz
Assistant Examiner—Jewel V. Thompson
(74) Attorney, Agent, or Firm—Cahill, von Hellens & Glazer P.L.C.

(57) ABSTRACT

A gas mass flow meter includes an elongated channel extending through a high thermal mass body and a critical flow nozzle in a downstream portion of the channel. A heat exchanger is provided upstream in the channel. Gas is forced through the heat exchanger and the critical flow nozzle at a flow rate of up to 5000 slm and at sufficiently high-pressure to ensure critical flow of the gas through the critical flow nozzle. The heat exchanger brings the gas close to the temperature of the high thermal mass body. The pressure of the gas is measured upstream and downstream from the nozzle and the temperature of the gas emerging from the heat exchanger is measured. The mass flow rate of gas through critical flow nozzle is computed from the upstream pressure, downstream pressure, temperature of the high thermal mass body, density of the gas, and a dimensional characteristic of the critical flow nozzle.

58 Claims, 4 Drawing Sheets

CRITICAL GAS FLOW MEASUREMENT APPARATUS AND METHOD

This application claims the benefit of prior filed co-pending U.S. provisional application Serial No. 60/334,793 filed Nov. 15, 2001 entitled "CRITICAL GAS FLOW MEASUREMENT APPARATUS AND METHOD" by Pierre R. Delajoud.

BACKGROUND OF THE INVENTION

The invention relates to improvements in gas flow measurement, and more specifically to use of critical flow nozzles for improved accuracy and/or for gas flow measurement at high mass flow rates.

By way of background, the measurement and control of the mass flow of gases is important in a wide variety of industrial processes. This includes the control of reactant gases used in semiconductor processes and pharmaceutical applications as well as the precise measurement of gases to create known gas blends. A variety of devices exist to measure and control mass flow and these devices need to be regularly calibrated with reference standards to assure their accuracy. The potential accuracy of the devices is continually improved in response to process needs and therefore the accuracy of the standards available to calibrate them must continually improve.

Perhaps the closest prior art includes the American National Standard entitled "Measurement of Gas Flow by Means of Critical Flow Venturi Nozzles", ASME/ANSI MFC-7M-1987 et ISO 9300:1990 sponsored and published by The American Society of Mechanical Engineers, incorporated herein by reference, and commonly assigned patent U.S. Pat. No. 5,445,035 entitled "PRECISION GAS MASS FLOW MEASUREMENT APPARATUS AND METHOD MAINTAINING CONSTANT FLUID TEMPERATURE IN THIN ELONGATED FLOW PATH" issued Aug. 29, 1995 to Pierre R .Delajoud, also incorporated herein by reference.

The above mentioned U.S. standard, hereinafter referred to as "the U.S. standard", discloses critical flow nozzles, in which the gas pressure upstream of the nozzle's throat is great enough relative to the downstream pressure to ensure that the gas flow velocity at the throat reaches "critical flow" or "sonic flow", i.e., reaches the local value of the speed of sound (acoustic velocity). The speed of sound in a critical flow nozzle is a limiting speed that the gas flow cannot exceed for given upstream conditions. The U.S. standard discloses equations that allow precise computation of the gas mass flow rate based on the nature of the gas, the throat diameter, the upstream pressure and temperature and certain thermodynamic characteristics of the flowing gas. In a critical flow nozzle, enough pressure is applied upstream from the nozzle throat relative to the downstream pressure to ensure that the gas flow velocity at the throat becomes critical, i.e., attains the speed of sound and cannot be increased further. The gas mass flow rate then becomes proportional to the density of the gas upstream of the nozzle, i.e., to the pressure upstream of the nozzle. The mass flow rate then can be precisely computed on the basis of the nature of the gas, the gas temperature and the pressure upstream of the nozzle.

The above mentioned U.S. standard describes use of critical flow nozzles to measure gas mass flow rates, and specifies or recommends all of the conditions for various uses of a critical flow nozzle, including the diameter of the upstream passage compared to the diameter of the nozzle, where the pressure connection should be located to read the upstream gas pressure, where the temperature probe should be positioned upstream of the nozzle, and various other parameters.

However, a problem of critical flow nozzles disclosed in the U.S. Standard is that for low gas flow rates, if the temperature of the incoming gas is substantially different than the ambient temperature, the difference can result in inaccurate measurement of the gas mass flow rate, because the temperature of the gas between the temperature probe and the critical flow nozzle is affected due to thermal conduction and radiation of the tube. Specifically, the U.S. standard teaches that the gas mass flow computations may be inaccurate if the temperature of the incoming gas is more than 5 degrees Centigrade different than the ambient temperature.

The U.S. standard recommends exact adherence to its published recommendations, and does not provide any suggestion of how more precise measurement of gas mass flow rates might be achieved.

Above mentioned U.S. Pat. No. 5,445,035 discloses a mass flow meter that includes a body having a cylindrical bore and an elongated cylindrical piston positioned in the bore concentrically with the body. An elongated annular fluid flow channel of uniform depth is bounded by a cylindrical surface of the piston and a surface of the bore, and the gas flows through the channel in the laminar flow regime. A first pressure measuring probe in fluid communication with an upstream equalization chamber measures fluid pressure in the upstream equalization chamber, and a second differential pressure transducer in fluid communication between the upstream equalization chamber and a downstream equalization chamber measures differential fluid pressure between the two equalization chambers. The difference between the pressures measured in the two equalization chambers represents the mass flow of the fluid through the channel. The simple, near-ideal geometric shapes of the bore, piston, and ferrules supporting the piston interact so as to permit simple, accurate mathematical modeling of corrections to account for changes in pressure, temperature, and thermal gradient. By design, the temperature of the gas in the flow path assumes the temperature of the body in which the bore is located so that the gas temperature can be determined by measuring the temperature of the body.

However, the mass flow meter described in U.S. Pat. No. 5,445,035 cannot provide accurate gas mass flow rate measurements at gas mass flow rates greater than approximately 30 standard liters per minute (slm). Even using the latest technology, the upper limit for gas flow rates that can be accurately measured using the laminar flow technology described in the '035 patent is approximately 100 slm. This is because as flow rate increases, the velocity of the gas in the flow path increases, and the gas is not in the flow meter body for a sufficient amount of time for the gas to precisely assume the temperature of the body.

The setup and exploitation of critical flow nozzles to measure gas mass flows are precisely defined by the above U.S. standard. The objective of the setup recommendations in the above U.S. standard is to be able to predict the gas flow from the diameter of the throat of the nozzle by means of the recommended calculations. The calculations use tables of value of the critical flow function for various gases as a function of the pressure and temperature upstream from the nozzle and a calculation of the discharge coefficient as a function of the Reynolds number of the gas flow. The calculation of the discharge coefficient is applicable only for Reynolds numbers greater than 1*10. Those skilled in the art will understand that a lower limit Reynolds number prevents use of the recommended calculations for low gas flow rates.

The problem faced by the applicant was how to use the well-known principles described in the above prior art, especially the U.S. standard, to achieve more precise, and especially more repeatable, gas flow rate measurements in the range of flow from less than a standard liter per minute to 5000 standard liters per minute.

Thus, there remains an unmet need for an improved mass flow meter that is capable of making accurate gas flow measurements which are more precise and especially more repeatable than the prior art mass flow meters at any gas flow rate, especially at gas flow rates up to approximately 5000 standard liters per minute or more.

SUMMARY OF THE INVENTION

Accordingly, it is an object of the invention to provide a mass flow meter capable of providing accurate, precisely repeatable gas flow measurements over a very wide range.

It is another object of the invention to provide a mass flow meter capable of providing accurate, precisely repeatable gas flow measurements at flow rates up to approximately 5000 liters per minute.

It is another object of the invention to provide a single mass flow meter with a very wide useful range or "rangeability", i.e., 10:1.

It is another object of the invention to provide a mass flow meter capable of providing accurate, precisely repeatable gas flow measurements at high flow rates using a physical structure quite similar to that of the prior laminar flow mass flow meters described in U.S. Pat. No. 5,445,035.

It is another object of the invention to provide a mass flow meter capable of providing more accurate, more precisely repeatable gas flow measurements, even at low flow rates, than is possible using the mass flow meter of U.S. Pat. No. 5,445,035.

It is another object of the invention to provide a mass flow meter which avoids instability over time caused by contamination from the gas flow being measured.

It is another object of the invention to provide a mass flow meter which is not significantly affected by a difference between the temperature of gas entering the flow meter and the ambient temperature.

It is another object of the invention to provide a mass flow meter that is not significantly affected by the geometry of piping upstream of and connected to the fluid inlet of the flow meter.

It is another object of the invention to provide a mass flow meter that can be used with the mass flow terminal described in U.S. Pat. No. 5,445,035.

Briefly described, and in accordance with a "low flow" embodiment thereof, the invention provides an apparatus and method for measuring gas flow at relatively low gas flow rates by providing an elongated fluid flow channel extending through a high thermal mass body, a critical flow nozzle in a downstream portion of the channel, and a heat exchanger in the upstream portion of the channel in close thermal contact with the high thermal mass body. Gas is forced to flow into an upstream portion of the channel and through the heat exchanger at a sufficiently high pressure to ensure critical flow of the gas through the critical flow nozzle, wherein the heat exchanger brings a temperature of gas emerging from the heat exchanger to a value essentially equal to the temperature of the high thermal mass body. The pressure of the gas in the upstream portion of the channel is measured and is caused to sufficiently exceed the pressure of the gas downstream from the critical flow nozzle to ensure sonic flow of the gas through the critical flow nozzle. The temperature of a portion of the high thermal mass body adjacent to the upstream portion of the channel is measured. The mass flow rate of gas through the critical flow nozzle is computed from the upstream pressure, the temperature of the high thermal mass body, and a dimensional characteristic (i.e., throat diameter) of the critical flow nozzle. In this embodiment, the flow of the gas into the channel is in the range from 100 standard cubic centimeters per minute to approximately 100 standard liters per minute. A flow straightener is provided in the upstream portion of the channel integrally with the heat exchanger, wherein the flow straightener includes a plurality of holes radially oriented about the flow channel. A programmable read-only memory unit stores information for use in computing the mass flow rate for different gases through the critical flow nozzle. The mass flow rate through the critical flow nozzle is computed using values of discharge coefficients that have been experimentally determined for the same Reynolds number values for each type of gas. The diameter of a passage through the critical flow nozzle is in the range from approximately 0.2 millimeters to approximately 2 millimeters. The heat exchanger is located less than 5 times the diameter of the channel upstream of the nozzle from an upstream face of the critical flow nozzle. The amount of expansion of a diameter of the throat of the critical flow nozzle due to change in temperature of the critical flow nozzle is computed using a measured temperature of the high thermal mass body, and the computed amount of expansion due to the upstream pressure is used to correct the throat diameter deformation in computing the mass flow rate of the gas through the critical flow nozzle.

In a "high flow" embodiment, an apparatus and method for measuring gas flow at relatively high flow rates includes providing an elongated fluid flow channel extending through a high thermal mass body, providing a critical flow nozzle in a downstream portion of the channel, and a heat exchanger in the upstream portion of the channel in close thermal contact with the high thermal mass body. Gas is forced to flow into an upstream portion of the channel and through the heat exchanger at a sufficiently high pressure to ensure critical flow of the gas through the critical flow nozzle. A heat exchanger is provided so as to bring the temperature of gas emerging from the heat exchanger very close to a temperature of the high thermal mass body. The pressure of the gas in the upstream portion of the channel is measured, and the pressure of the gas in the upstream portion of the channel is caused to sufficiently exceed a pressure of the gas downstream from the critical flow nozzle to ensure sonic flow of the gas through the critical flow nozzle. The temperature of gas emerging from the heat exchanger upstream from the critical flow nozzle is measured. The mass flow rate of gas through the critical flow nozzle is computed from the upstream pressure, the temperature of the gas, and a dimensional characteristic of the critical flow nozzle. In one described "high flow" embodiment, the flow rate of the gas into the channel is in the range from 5 standard liters per minute to approximately 5000 standard liters per minute, although the various device dimensions and the range of flow rates of the gas into the channel for this embodiment of the invention are completely scalable. A flow straightener is provided integrally with the heat exchanger. A programmable read-only memory unit stores information for use in computing the mass flow rate through the critical flow nozzle using values of discharge coefficient that have been experimentally determined for each gas type. The passage through the critical flow nozzle is in the range from approximately 1 millimeter to approximately 10 or more millimeters. The heat exchanger is located less than 5 times the diameter of the channel upstream of the nozzle from an upstream face of the critical flow nozzle. An amount of expansion of a diameter of a throat of the critical flow nozzle due to a change in temperature of the critical flow nozzle is computed, and the computed amount of expansion due to the upstream pressure is used to correct the throat diameter deformation in computing a mass flow rate of gas through the critical flow nozzle.

DETAILED DESCRIPTION OF THE PREFERRED EMBODIMENTS

In accordance with present invention, it was discovered that a substantial problem limiting the reproducibility of measurements of low gas mass flows through a critical flow nozzle is the reliable determination of the temperature of the gas upstream of the nozzle. The U.S. standard referred to above recommends that a temperature probe be installed upstream in the gas stream at a distance equal to twice the diameter of the upstream passage from the critical flow nozzle. When the gas flow rate is low, the velocity of the gas in the upstream passage also is low, so the temperature of the gas is substantially influenced by the temperature of the tube in which gas is flowing, due to thermal conduction and radiation of the tube. The temperature of the tube is influenced by the ambient temperature, which is usually different from the temperature of the incoming gas to be measured. The temperature of the incoming gas entering the critical flow nozzle therefore is different from the temperature measured by the temperature probe. This leads to non-reproducible measurements that are undesirably dependent on the difference between the temperature of the incoming gas and the ambient temperature.

Figure 1A:
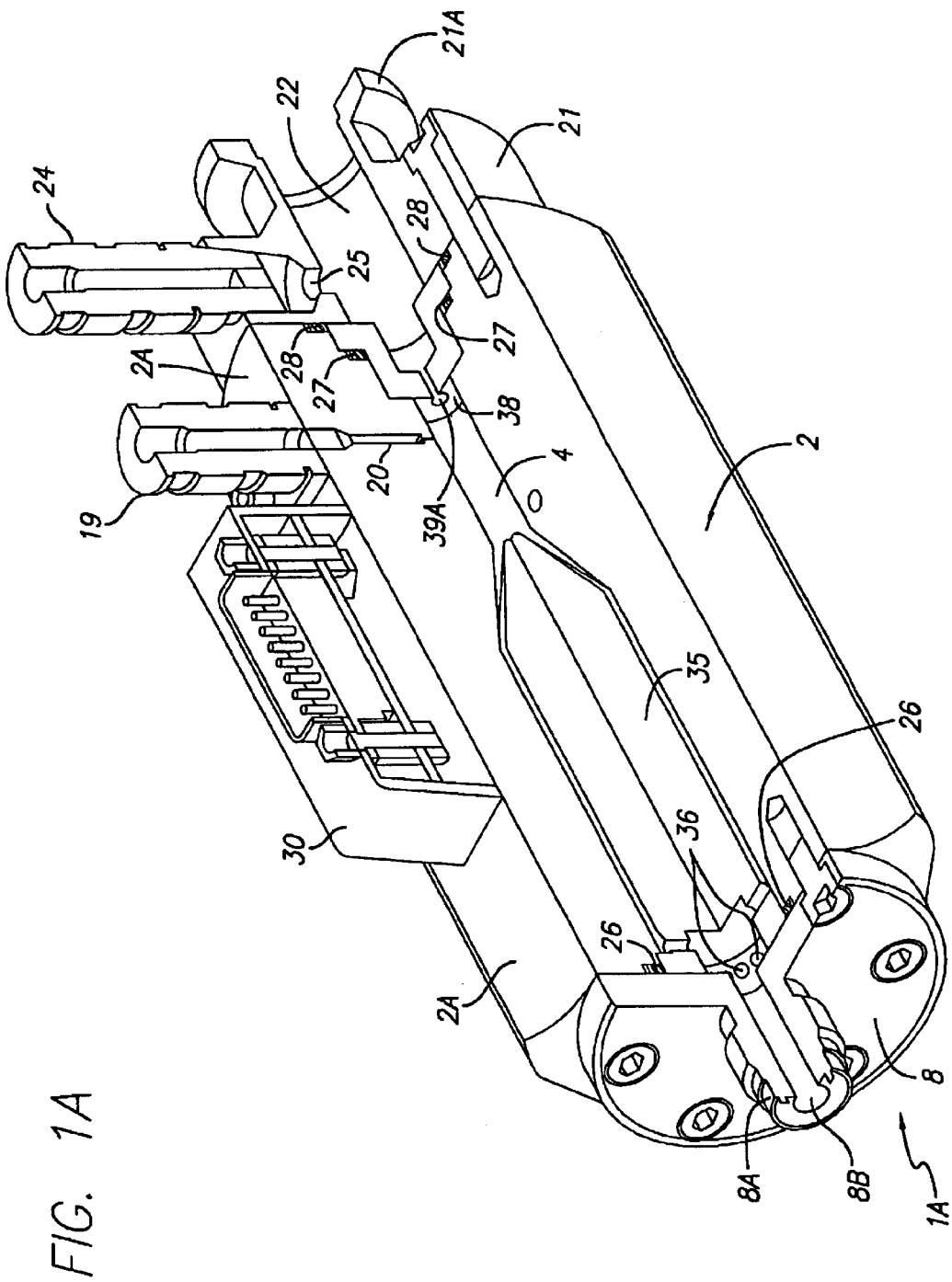
FIG. 1A is a perspective partial cut-away view of a low flow critical flow nozzle mass flow meter according to the present invention.
Figure 1B:
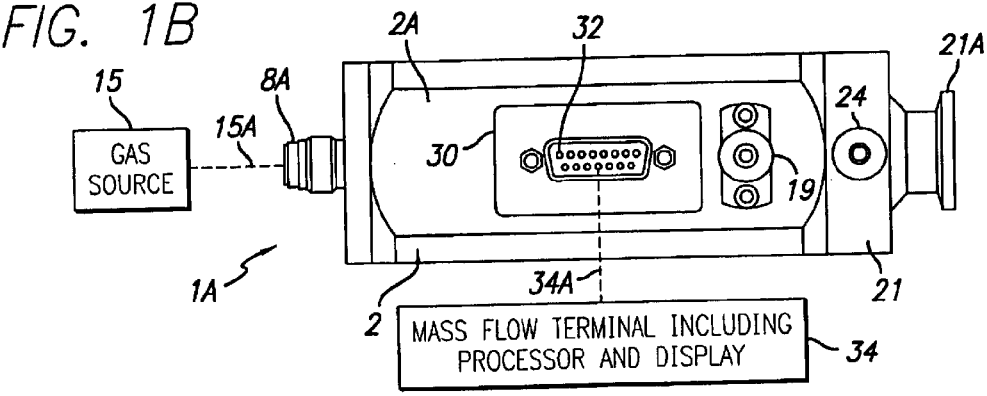
FIG. 1B is a top view of the mass flow meter of FIG. 1A.

FIG. 1A illustrates a partial cutaway perspective view of a "low flow" mass flow meter 1A capable of accurate, very repeatable gas mass flow measurements at gas flow rates in the range of approximately 100 standard cubic centimeters per minute to 100 standard liters per minute, and FIGS. 1B–G illustrate various section views thereof.

Figures 1C, 1D:
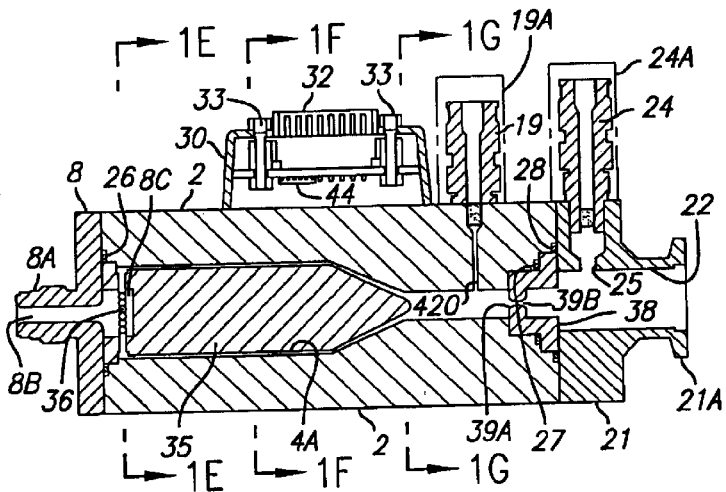
FIG. 1C is a left end view of the mass flow meter of FIG. 1A.
FIG. 1D is a section view along section line 1D—1D of FIG. 1C.
Figure 1E:
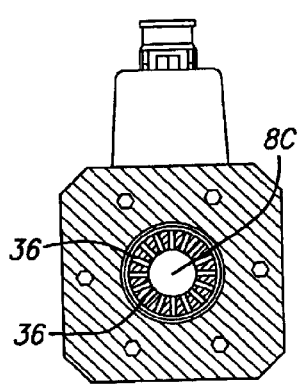
FIG. 1E is a section view along section line 1E—1E of FIG. 1D.
Figure 1F:
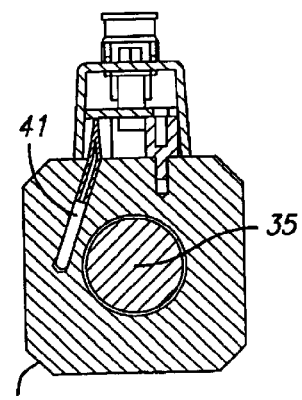
FIG. 1F is a section view along section line 1F—1F of FIG. 1D.
Figure 1G:
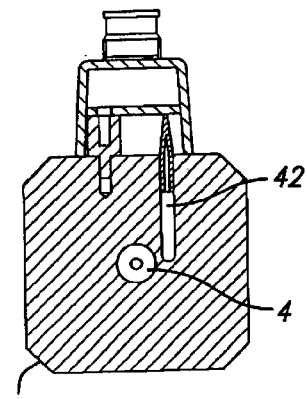
FIG. 1G is a section view along section line 1G—1G of FIG. 1D.

Referring now to FIGS. 1A–G, mass flow meter 1A includes an elongated main heavy, high thermal mass body 2. High thermal mass body 2 has a longitudinal cylindrical passage 4 extending from the right end portion of high thermal mass body 2 to an enlarged passage 4A (FIG. 1D). Enlarged passage 4A extends to the left end of high thermal mass body 2. A heat exchanger 35 is located in enlarged passage 4A, so gas flowing from a gas source 15 through a tube 15A into the left end of mass flow meter 1A passes through heat exchanger 35 before entering passage 4. A flow straightener 36 includes a plurality of radially oriented holes 36. There are typically 16 holes 36, and their function is to eliminate any rotational motion in the incoming gas stream so that downstream of the holes, in the annular flow path of heat exchanger 35, the gas stream is parallel to the axis of the critical flow nozzle. End cap 8 is attached to the vertical left face of high thermal mass body 2 by means of the illustrated set screws. An O ring 26 provides a seal between the inner face of end cap 8 and the left end face of high thermal mass body 2. End cap 8 includes a pressure connection 8A for connecting to the 15A conducting gas into mass flow meter 1B. A passage 8B extends through end cap 8 to conduct incoming gas into flow straightener 36 and heat exchanger 35. A first temperature probe 41 (FIG. 1F) extends into the wall of high thermal mass body 2. A second temperature probe 42 (FIG. 1G) also extends into the wall of high thermal mass body 2.

An end cap 21 is attached to a vertical right end face of high thermal mass body 2 by means of the illustrated screws, with an O ring 28 forming a seal between the inner face of end cap 21 and the right end face of high thermal mass body 2. End cap 21 includes a flange 21A for attachment of mass flow meter 1A to vacuum, atmospheric pressure or another flow device (not shown). End cap 21 holds critical flow nozzle 38 in place. A cylindrical passage 22 extends through end cap 21, in fluid communication with the Venturi aperture a critical flow nozzle 38, which is located in the right end portion of passage 4. Critical flow nozzle 38 includes an enlarged toroidal inlet 39A and a narrowed Venturi aperture/passage 39B, the diameter of which increases slightly from a minimum value with increasing distance toward the outlet end of critical flow nozzle 38. A typical minimum diameter (i.e., a typical minimum throat diameter) of the passage 39A, B through critical flow nozzle 38 is approximately 0.2 mm (millimeters), and a typical length of that passage is approximately 10 times the throat diameter, as defined by the above U.S. standard. An O ring 27 forms a seal between high thermal mass body 2 and critical flow nozzle 38.

Since critical flow nozzle 38 is mounted in direct thermal contact with the high thermal inertia high thermal mass body 2, the temperature of critical flow nozzle 38 is precisely equal to the temperature of the mass flow meter high thermal mass body 2. Therefore, the temperature of high thermal mass body 2 is used to compute variation in the throat diameter of critical flow nozzle 38 due to thermal expansivity of the nozzle material. (In this regard, and by way of definition, the temperature probe 41 shown in FIG. 1F to measure the temperature of high thermal mass body 2 is said to be "associated with" the upstream portion 4A of channel 4. Similarly, in FIG. 2A, the temperature probes 12A and 12B which are located in channel 4 also are said to be "associated with" the upstream portion of channel 4.) Real-time corrections are made for changing of the diameter of the throat of critical flow nozzle 38 due to temperature variations. The diameter of passage 4 in an implementation by the assignee of the embodiment of FIGS. 1A–G is 8 millimeters, which is at least 4 times the throat diameter of the flow nozzle 38 (as recommended by the U.S. standard).

An upstream pressure connector 19 is attached to an upper surface 2A of high thermal mass body 2 in fluid communication with horizontal (as illustrated) cylindrical passage 4 via a vertical passage 20. A downstream pressure connector 24 is attached to an upper surface of right end cap 21 and is in fluid communication with the passage 22 via a passage 25A. (Alternatively, an upstream pressure transducer indicated by dashed line 19A can be connected in fluid communication with passage 4 through vertical passage 20, and a downstream pressure transducer indicated by dashed line 24A can be connected in fluid communication with passage 22 through passage 25.)

An electronic module 30 attached to upper surface 2A of high thermal mass body 2 contains electronic circuitry including a programmable read only memory 44. Read only memory 44 stores various constants/information needed to make mass flow computations based on the equations in the above mentioned U.S. standard. Reference numeral 32 designates an electrical connector for reading read-only memory 44 in module 30 and for reading the resistance of the temperature probes 41 and 42. Reference number 33 designates conventional cable connector screws to secure the connector of a cable (not shown) from a mass flow measurement terminal of the type described in the '035 patent to connector 32. Reference numeral 34 designates the mass flow terminal and included processor and display described in the '035 patent, connected by a communications cable 34A to connector 32. The processor in mass flow terminal 34 is programmed to read the temperature and pressure measurements described herein and to access read only memory 44, and to make the computations described herein.

The present invention as shown in FIG. 1A provides critical flow nozzle 38 in the path of passage 4 through a high thermal mass body 2 having high thermal mass. It should be understood that it is very important that the high thermal mass body 2, which can be composed of stainless steel, have very high thermal mass, and hence be proportionately heavy. The high thermal mass body 2 in the above described embodiment of FIGS. 1A–G weighs between 2 and 3 kilograms.

The invention also includes providing the flow straightener/heat exchanger 36/35 between the high thermal mass body of the mass flow meter and the flow of the upstream gas. This structure ensures that for low gas flow rates, the temperature of the upstream gas becomes precisely equal to the temperature of the mass flow meter high thermal mass body 2. To the applicant's knowledge, this technique has never been used in a critical flow nozzle mass flow meter and is contrary to the teachings of the U.S. standard.

The temperature sensors 41 and 42 then are used to measure the temperature of high thermal mass body 2, which is used instead of a directly measured temperature of the upstream gas to calculate the gas mass flow rate according to the equations as generally set forth in the U.S. standard and modified as described hereinafter to correct the nozzle throat diameter for the influence of temperature on the nozzle material and to correct for the influence of the pressure upstream of the nozzle on the deformation of the throat diameter, in order to obtain a very high degree of stability/repeatability of mass flow measurements.

The critical flow nozzle mass flow meter of FIG. 1A is calibrated directly with a primary standard, i.e., gravimetrically, to determine a discharge coefficient for the critical flow nozzle 16 and for the specific gas flow, starting from a Reynolds number as low as $1*10^3$. The discharge coefficients/variables are stored in the EPROM (electrically programmable read-only memory) 44 in electronic module 30 attached to the high thermal mass body 2 of the mass flow meter 1A in which critical flow nozzle 38 is installed.

The disclosed critical flow nozzle implementation of the mass flow meter 1A of FIG. 1A is opposed to the above mentioned U.S. standard because the U.S. standard recommends the use of specific discharge coefficient variable values intended to be valid for all gases and only for a Reynolds number in the range of $1*10^5$ to $1*10^7$.

Critical flow nozzle 38 is exposed to the high upstream gas pressure (which may, for example, be as high as 700 kPa (100 pounds per square inch), or even much higher, in passage 4 for the particular embodiment disclosed in FIG. 1A, which has a body weight of 2–3 kilograms (4.4–6.6 pounds). The application of this pressure to the internal and external surfaces of the nozzle up to O ring 27 causes a slight deformation in the diameter of the nozzle throat. (Higher pressures would cause more significant deformation in the diameter of the nozzle throat.) The deformation of the throat diameter can be calculated and used in the equations for computing the mass flow rate through critical flow nozzle 38.

The basic formula for the computation of the mass rate of flow $q_m$ is:

$$q_m = (A^*)(C)(C^*)(P)/[(R/M) \cdot T]^{1/2} \qquad \text{Eq.(1)}$$

$q_m$: mass flow of the gas. (kg.s$^{-1}$)

$A^*$: Cross-sectional area of the Venturi nozzle throat. (m$^2$)

$C$: Discharge coefficient. (dimensionless)

$C^*$: Critical flow function of a real gas at the nozzle throat. (dimensionless)

P: Absolute upstream pressure measured at the pressure connection. (Pa)

T: Average absolute upstream temperature measured by the two temperature probes. (K)

R: Universal gas constant. (J.kmol$^{-1}$K$^{-1}$)

M: Molar mass. (kg kmol$^{-1}$) with $$A^* = \pi d^2/4[1+2\alpha(T-293.15)]*(1+\lambda P) \qquad \text{Eq.(2)}$$

d: Diameter of the Venturi nozzle throat. (m)

$\alpha$: Linear coefficient of thermal expansion of the material of the nozzle 1. (K$^{-1}$)

$\lambda$: Deformation coefficient with the upstream pressure of the nozzle throat. (Pa$^{-1}$)

$$C = a - b \, Re_d^{-n} \qquad \text{Eq.(3)}$$

a, b, n, are coefficients determined experimentally from gravimetric calibration.

$Re_d$: Reynolds number at the nozzle throat. (dimensionless)

$C^*$ = values of the critical flow function for various real gases defined by the International standard as a function of P and T.

$$Re_d = 4q_m/\pi d\mu \qquad \text{Eq.(4)}$$

$\mu$: Dynamic viscosity of the gas in P,T conditions (Pa.s).

It should be noted that the correction for the deformation of the nozzle throat diameter represented by Equation (3) is for the difference in temperature of the nozzle relative to a standard temperature of 20 degrees Centigrade or 293.15 degrees Kelvin at which the nominal diameter of the nozzle throat is given. It also should be noted that the value of the discharge coefficient used for the calculation of the mass flow is a function of the Reynolds number which in turn depends on the mass flow. The mass flow may be solved by first assuming that the Reynolds number is infinite and then iterating the solution using the calculated flow for a new determination of the Reynolds number. The solution converges quickly.

The objective of flow straightener 36 located upstream of critical flow nozzle 38 of mass flow meter 1A is to eliminate sensitivity to the geometry of an inlet tubing 15A, which may include elbows or Tees, upstream of connection 8A. The plurality of holes 36 of the flow straightener are disposed radially with respect to the incoming flow stream, arresting any rotational movement in the incoming flow stream. The annular space 4A (FIG. 1D) through which the gas flows before entering passage 4 and critical flow nozzle 38 is symmetrical and parallel to the cylindrical axis of the critical flow nozzle, and this results in the gas stream entering nozzle 38 been perfectly parallel to the cylindrical axis of the nozzle throat.

Heat exchanger 35 is located only three diameters (of passage 4) upstream from the throat 39A of critical flow nozzle 38 in FIG. 1A. This is opposed to the teachings of the U.S. standard, which teaches that nothing must be in the gas flow channel closer than 5 passage 4 diameters to passage 4 upstream of the throat of the nozzle.

Figure 2A:
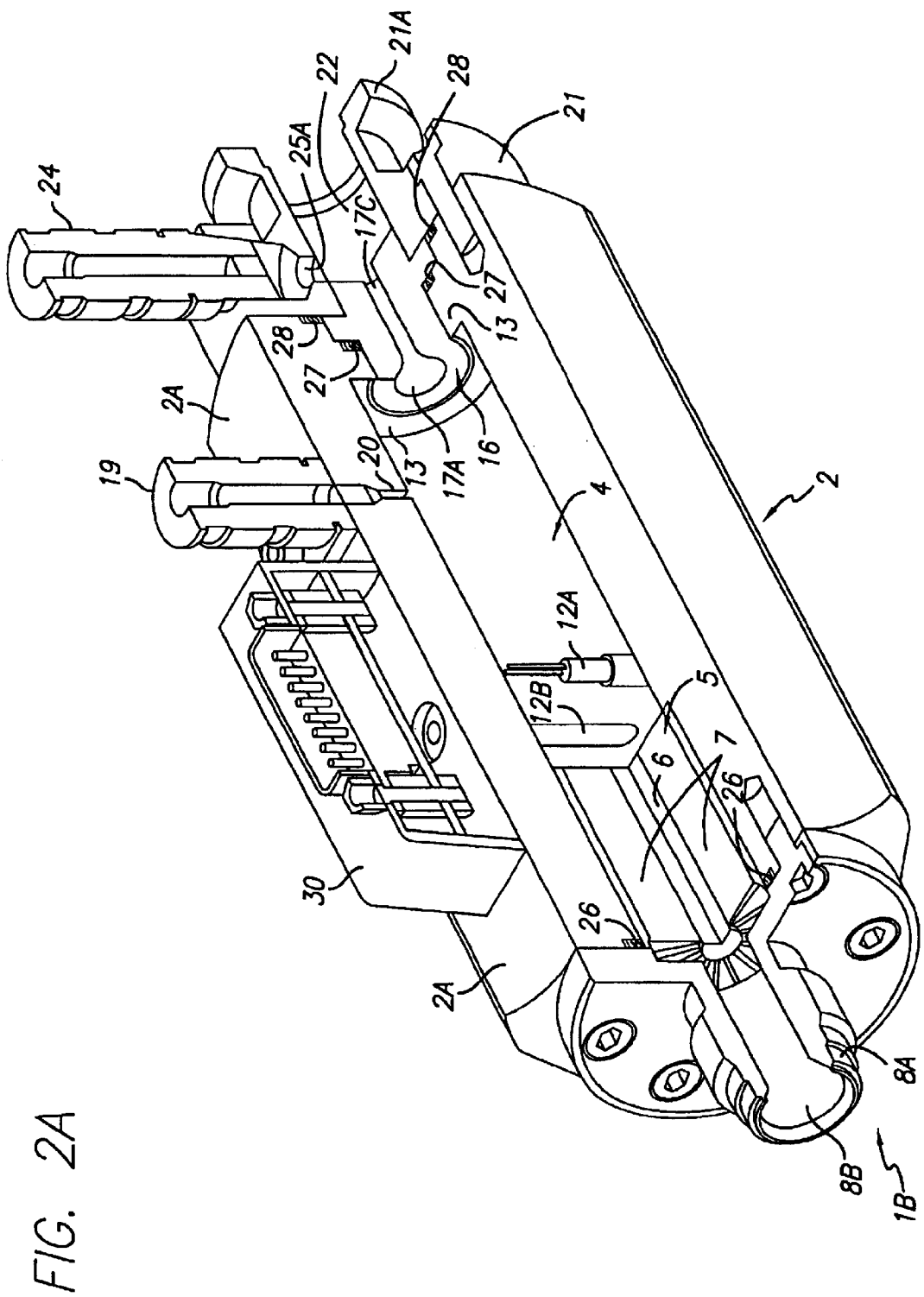
FIG. 2A is a perspective partial cut-away view of a high flow critical flow nozzle mass flow meter according to the present invention.
Figure 2B:
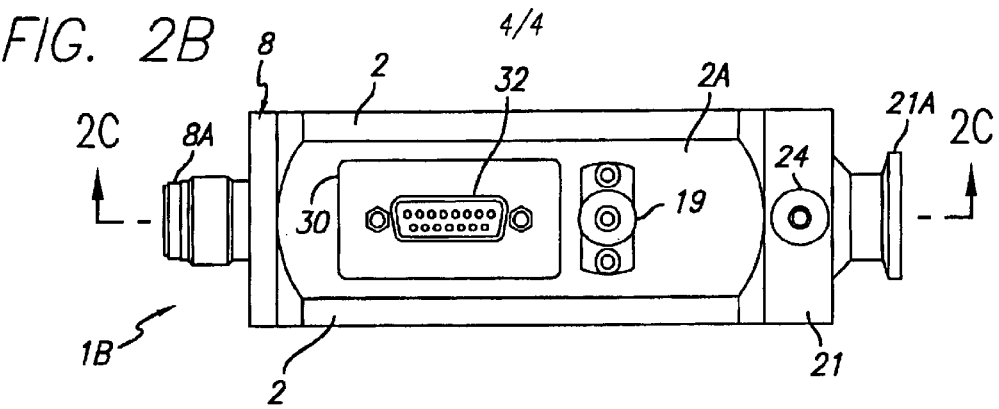
FIG. 2B is a top view of the mass flow meter of FIG. 2A.
Figure 2C:
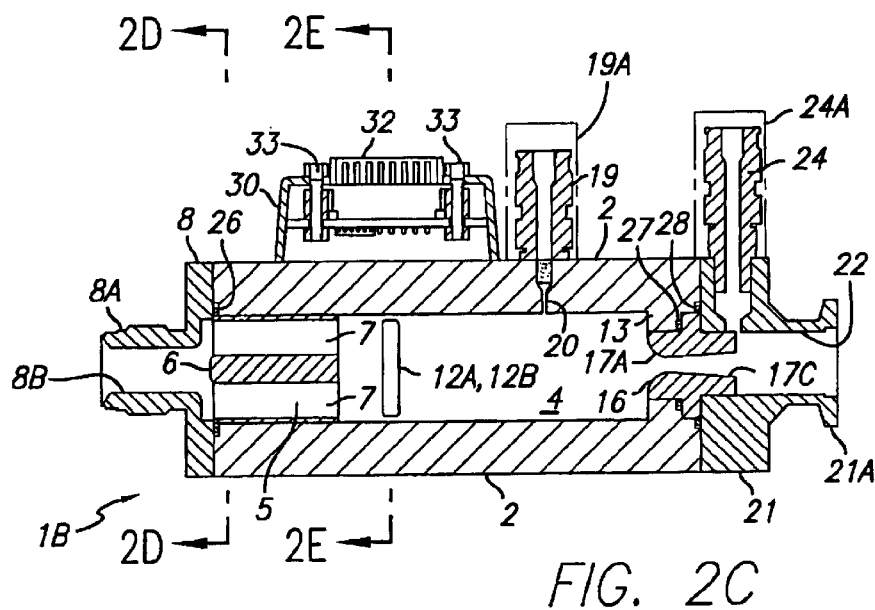
FIG. 2C is a section view along section line 2C—2C of FIG. 2B.
Figure 2D:
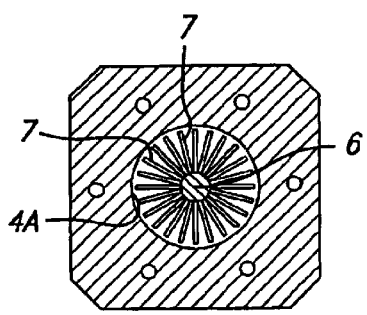
FIG. 2D is a section view along section line 2D—2D of FIG. 2C.
Figure 2E:
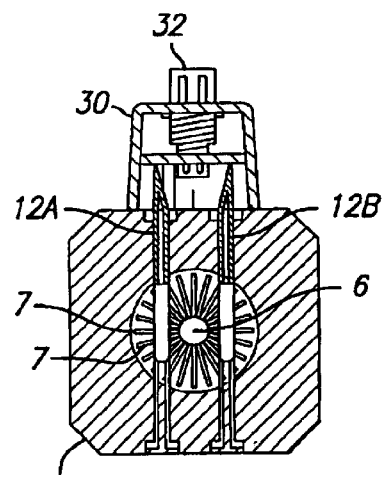
FIG. 2E is a section view along section line 2E—2E of FIG. 2C.

Next, FIG. 2A illustrates a partial cutaway perspective view of a "high flow" mass flow meter 1B that provides accurate, highly repeatable mass flow measurements at high gas flow rates, e.g., up to approximately 5000 standard liters per minute, and FIGS. 2B–E show various section views thereof. Where appropriate, the same reference numerals are used in FIGS. 2A–E as in FIGS. 1A–G to designate the same or similar parts.

Referring now to FIGS. 2A–E, mass flow meter 1B includes elongated main high thermal mass body 2 including a longitudinal cylindrical passage 4 extending from the left end of high thermal mass body 2 to the right end thereof. A flow straightener/heat exchanger 5 made of titanium is press fit in a bore concentrically with passage 4 in the left end portion of high thermal mass body 2 so that gas flowing into the left end of mass flow meter 1B flows through flow straightener/heat exchanger 5 before entering passage 4. Flow straightener/heat exchanger 5 supports a plurality (e.g., 24 to 48) of radially oriented slots 7 and includes a cylindrical plug 6 that is positioned concentrically with cylindrical passage 4. Cylindrical plug 6 is composed of stainless steel. An end cap 8 is attached to the vertical left end of high thermal mass body 2 by means of the illustrated screws. An O ring 26 provides a seal between the inner face of end cap 8 and the left end face of high thermal mass body 2. End cap 8 includes a connection 8A for connecting a tube 15A conducting gas into high flow mass meter 1B. A passage 8B extends through end cap 8 to conduct incoming gas into flow straightener/heat exchanger 5. A pair of temperature probes 12A and 12B extend through the wall of high thermal mass body 2 into the flow of gas through passage 4.

A right end cap 21 is attached by means of the illustrated screws to the right end face of high thermal mass body 2, with an O ring 28 forming a seal between the inner face of end cap 21 and the right end face of high thermal mass body 2. End cap 21 includes a flange 21A for attachment of mass flow meter 1B to a connection to a vacuum, to atmospheric pressure, or to another flow device (not shown). End cap 21 holds a larger critical flow nozzle 16 in place. A cylindrical passage 22 extends through end cap 21, in fluid communication with the aperture of critical flow nozzle 16. An annular ridge 13 integral with high thermal mass body 2 is located in the right portion of passage 4 a short distance from the right end face of high thermal mass body 2, and supports critical flow nozzle 16. An O ring 27 forms a seal between annular high thermal mass body 2 and critical flow nozzle 16. Critical flow nozzle 16 includes an enlarged toroidal inlet 17A and a narrowed passage 17C, the diameter of which increases slightly from a minimum value with increasing distance toward the outlet end of critical flow nozzle 16. A typical minimum diameter (i.e., throat diameter) of the passage 17C through critical flow nozzle 16 is approximately 1 millimeter, and a typical length of that passage is approximately 10 times the minimum throat diameter, as defined by the above U.S. standard. The diameter of passage 4 in a first implementation by the assignee of the embodiment of FIGS. 2A–E is 24 millimeters, which is at least 4 times the throat diameter of the flow nozzle 16 and which can accommodate a critical flow nozzle with a throat diameter up to 6 millimeters. In a second "scaled-up" implementation of the embodiment of FIGS. 2A–G by the assignee, the diameter of passage 4 is 48 millimeters and which can accommodate a critical flow nozzle with a throat diameter up to 12 millimeters, to accomplish accurate, repeatable mass flow measurement at four times the gas mass flow rates at which the same accuracy and repeatability can be accomplished by the first mentioned implementation.

As in the embodiment of FIGS. 1A–G, it should be understood that it is very important that the stainless steel high thermal mass body 2 have very high thermal mass, and hence be proportionately heavy. For a given heat exchanger, the larger the thermal mass is for high thermal mass body 2, the slower its temperature will change as a result of a temperature difference between the incoming gas and the temperature of the high thermal mass body 2 . Therefore, a very large thermal mass of high thermal mass body 2 results in increasing the stability of the mass flow meters of the present invention, including the embodiments of FIGS. 1A–G and FIGS. 2A–E. The high thermal mass body 2 in the above described embodiment of FIGS. 2A–E weighs approximately 2 to 3 kilograms. If its linear dimensions are scaled up by a factor of 2, and then its weight is quadrupled, and increases to roughly 10 kilograms (22 pounds).

An upstream pressure connector 19 (or alternatively, an upstream pressure transducer) is attached to an upper surface 2A of high thermal mass body 2 in fluid communication with cylindrical passage 4 via a passage 20. A downstream pressure connector 24 (or alternatively, a downstream pressure transducer) is attached to an upper surface of end cap 21 in fluid communication with the passage 22 through end cap 21 via a passage 25. A module 30 attached to upper surface 2A of high thermal mass body 2 contains electronic circuitry including a programmable read only memory which stores various constants needed to make the necessary mass flow computations based on the equations in the above mentioned U.S. standard.

Critical flow nozzle 16 in FIG. 2A is exposed to the high upstream gas pressure (which may, for example, be as high as 700 kPa (100 pounds per square inch) or even much higher in passage 4 for the described embodiment wherein the weight of high thermal mass body 2 is approximately 2–3 kilograms (4.4 to 6.6 pounds). The embodiment of FIGS. 2A–E is completely scalable, so the maximum gas flow rate can be increased proportionally to the square of its linear dimensions. The application of this pressure to the internal and external surfaces of critical flow nozzle 16 and O ring 27 causes a slight deformation in the diameter of the nozzle throat. The deformation of the throat diameter can be calculated and used in the equations for computing the mass flow rate through critical flow nozzle 16. The equations set forth above are equally applicable to the embodiment of FIG. 2A.

High mass flow meter 1B of FIG. 2A includes a different flow straightener/heat exchanger design than low mass flow meter 1A of FIG. 1A. Instead of forcing the gas in the high flow embodiment of FIG. 2A to assume the temperature of high thermal mass body 2 as in the low flow embodiment of FIG. 1A, the flow straightener/heat exchanger 5 in FIG. 2A functions to bring the high flow gas temperature close to the temperature of high thermal mass body 2 (e.g., to within one degree Centigrade of the temperature of high thermal mass body 2). The use of the radial holes 36 in FIGS. 1A and 1D is suitable for the low gas flow straightener and the very small gap between the heat exchanger 35 and the high thermal mass body 2 is adequate in the mass flow meter of FIG. 1A, but at the higher mass flow rates appropriate to the mass flow meter of FIG. 2A, it was found that a more efficient heat exchanger is needed. The slot type heat exchanger in FIG. 2A ensures a larger surface of thermal exchange with the gas in a very compact space, and the titanium material ensures a good thermal exchange between the gas and the high thermal mass body as it has a much higher thermal conductivity than stainless steel. Since titanium is not corrosive, the heat exchange characteristic between the gas and the heat exchanger is not affected by superficial corrosion over time.

The two temperature probes 12A and 12B extend into passage 4 and measure an average temperature of the upstream gas within one passage 4 diameter after it emerges from the flow straightener/heat exchanger 5. The flow straightener/heat exchanger 5 of FIG. 2A also prevents rotation in the upstream flow of the gas being measured.

The U.S. standard recommends not placing anything in the gas flow channel closer than 5 passage 4 diameters from the face of the nozzle except temperature probes, which should be 2 passage 4 diameters from the face of the nozzle. In contrast, the mass flow meter of FIGS. 2A–E violates the foregoing teaching of the U.S. standard by having the flow straightener at a distance of three passage 4 diameters from the nozzle.

The critical flow nozzle mass flow meters described herein are calibrated using a primary standard. This calibration procedure involves precise, real-time weighing of a bottle of gas as the gas flows through the mass flow device, and comparing the flow meter measured value of gas mass flow with the variation in the weights of the bottle per unit of time during the measurement. The objective of the calibration is to accurately determine the values of coefficients a and b of the discharge coefficient equation, Equation (3), for each gas with which the calibration is performed and for Reynolds number values lower than $1*10^5$, e.g. as low as $1*10^3$, in opposition to the teaching of the U.S. standard that the Reynolds number must be greater than $1*10^5$ and the values of a and b are 0.9935 and 1.525, respectively, for any gas. Most users of critical flow nozzle type mass flow meters would expect to use them as references which would produce very accurate, highly repeatable mass flow measurements. The critical flow nozzle mass flow meters of FIGS. 1A–G and FIGS. 2A–E, after being calibrated according to an absolute reference, are capable of repeatedly providing extremely accurate mass flow measurements.

Contrary to the recommendations of the U.S. standard, the mass flow meter of FIGS. 1A–G provides a very large upstream thermal inertia heat exchanger/flow straightener 35 to bring the temperature of the upstream gas almost exactly to the temperature of the high thermal mass body 2. The mass flow is computed from the measurement of the temperature of the high thermal mass body 2 rather than the direct temperature of the upstream gas, contrary to the recommendations of the U.S. standard. In the mass flow meter of FIGS. 1A–G, the upstream gas flows through the radial holes 36 and heat exchanger 35 is located a distance of three passage 4 diameters from the critical flow nozzle, which is contrary to the recommendations of the U.S. standard.

For the mass flow meter of FIGS. 1A–G, the flow straightener function is necessary to eliminate rotational movement of the gas because if there is rotational movement of the gas, then its velocity when it gets to the throat of the nozzle is different from the assumed velocity and could affect the mass flow measurements.

The U.S. standard mainly emphasizes accurate computation of gas flow through the critical flow nozzle based on measurement of the diameter of the critical flow nozzle, whereas the mass flow meters of FIGS. 1A–G and FIGS. 2A–E provide extremely precise repeatability and obtain accuracy by calibration with an accurate standard (e.g., a gravimetric standard). The present invention achieves this by integrating all of the elements that affect the flowing condition of the gas upstream of the critical flow nozzle into one assembly, thus ensuring that the flowing conditions are always the same regardless of the installation and operating conditions of the flow meter, by taking into account the effect of temperature and pressure on the nozzle throat diameter, and by use of very high accuracy pressure transducers to measure the upstream pressure.

The applicant believes that the U.S. standard and the other known prior art for critical flow nozzles all is directed to use of critical flow nozzles as primary standards or to using the critical flow nozzle alone, disassociated from the elements that affect flow conditions. In the first case, gas mass flow is computed from knowledge of the dimensions of the critical flow nozzle and from measurements of the upstream gas temperature and pressure, using the equations disclosed in the U.S. standard without the need for a reference calibration flow value. In the second case, the calibration is performed in a setup different from the one in which the critical flow nozzle is intended to be used and with different pressure and temperature instrumentation However, in the first case, those skilled in the art know that use of critical flow nozzles as a primary standard to make gas mass flow measurements involves relatively high uncertainties and, in the second case, that high accuracy and high repeatability of mass flow measurements is difficult to achieve due to the influences of installation and ambient conditions, and due to the fact that many influences on repeatability or stability of mass flow measurements are not directly dependent on only the critical flow nozzle.

In contrast to prior mass flow meters using critical flow nozzles, the mass flow meters of FIGS. 1A–G and FIGS. 2A–E provide mass flow meters that can provide extremely stable, i.e., repeatable, gas mass flow measurements which are essentially nearly as precise as those provided by a primary standard if the mass flow meters are first calibrated with the primary standard. That enables the user to repeatedly use the mass flow meters of FIGS. 1A–G and FIGS. 2A–E as extremely precise mass flow references.

Even at the same flow rates as the prior laminar mass flow meter disclosed in the '035 patent, the new critical flow nozzle mass flow meters of FIGS. 1A–G and FIGS. 2A–E are both more accurate and capable of more repeatable gas mass flow measurements than the mass flow meters disclosed in the '035 patent for flow values greater than a few hundred standard cubic centimeters per minute. The difference in repeatability is due largely to the elimination of the uncertainty in differential pressure measurements required in the mass flow meters of the '035 patent as the differential pressure becomes very small. Since there is no differential pressure measurement when using a critical flow nozzle, it is possible to measure the pressure upstream from the critical flow nozzle with two identical transducers contained in the standard flow measurement terminal, and this reduces the uncertainty associated with the measurement of the pressure upstream of the critical flow nozzle. Also, the fact that the viscosity of gas has no influence in a critical flow nozzle reduces the effect of uncertainty in the measurement of the temperature of the gas upon the viscosity of the gas.

It should be appreciated that contamination of a mass flow meter of the '035 patent can be caused by contaminating matter in the gas being measured, and can result in instability of the mass flow measurements, that is, in non-repeatability of the measurements. This is because the laminar flow passages are very narrow in the laminar flow mass flow meters, e.g. as narrow as 35 microns, making them much more susceptible to deposited contamination within the gas flow passages altering the flow and hence the accuracy and stability of the gas flow measurements. However, the smallest critical flow nozzle diameters are approximately 200 microns, so any deposit of contamination substance in the Venturi aperture of a critical flow nozzle will have far less effect in obstructing the flow of gas than would be caused by the same deposit of contamination substance in a low flow laminar mass flow meter of the '035 patent, and hence will have far less effect on the stability of the mass flow measurements. As the gas present at the throat diameter is at sonic speed, there is less potential for contamination deposited from the gas than there is in the mass flow meter of the '035 patent in which the gas velocity is much lower.

One advantage of the critical flow nozzle mass flow meters of FIGS. 1A–G and FIGS. 2A–E that they can be used to allow a user to provide a wide range of mass flow measurement products using the same mass flow terminal described in the '035 patent, including both critical flow nozzle mass flow meters and laminar flow mass flow meters. And the main advantage of the mass flow meter of the above described embodiment of FIGS. 2A–E is not only that it can provide good accuracy, but more importantly, it can provide extremely good stability/repeatability for a very wide range of gas flows. Since the embodiment of FIGS. 2A–E is completely scalable, if the linear dimensions of above described embodiment of FIGS. 2A–E are scaled up by a factor of, for example 2, then the same extremely good stability/repeatability is obtained for gas flow rates scaled up by a factor of 4. For example, if the embodiment of FIGS. 2A–E is designed to be used for flows up to 1250 standard meters per minute, scaling up the linear dimensions by a factor of 2 provides a flow meter providing the same reproducibility and accuracy for flows up to 5000 standard meters per minute at the same upstream pressure.

In order to achieve the minimum ratio of the pressures upstream and downstream of the critical flow nozzle necessary to ensure sonic flow as required by the U.S. standard, it can be very helpful to reduce the downstream pressure by connecting a vacuum pump to the downstream connection 21A. This will substantially reduce the minimum value of the upstream gas pressure that can be accurately measured using the critical flow nozzle, and therefore will substantially increase the "rangeability" of the gas flow meter. For example, if the pressure range of the mass flow terminal (e.g., the one described in the '035 patent) to which a mass flow meter of FIGS. 1A–G or FIGS. 2A–E of the present invention is connected is 600 kPa, the critical pressure range with the gas through the nozzle flowing to atmospheric pressure is approximately 600 to 200 kPa (a ratio of 3:1), but with a vacuum pump connected downstream of the critical flow nozzle the critical pressure range and thus the flow range can be extended to approximately 600 to 30 kPa (a ratio of 20:1).

The U.S. standard states that the Reynolds numbers which are valid for purposes of using the recommended calculations should be greater than $1*10^5$. In contrast, for the mass flow meters of FIGS. 1A–G and FIGS. 2A–E, the Reynolds numbers for critical flow gas flows in the critical flow nozzles are in the range of approximately $1*10^3$ to $1*10^6$. For those Reynolds numbers less than $1*10^5$, the percentage change of discharge coefficient with Reynolds number is substantially larger, so when the Reynolds number is low, the actual discharge coefficient values are far from those given by the U.S. standard. Therefore, the U.S. standard's recommendations cannot be used for Reynolds numbers below $1*10^5$.

Thus, the variations in the mass flow meters of FIGS. 1A–G and FIGS. 2A–E from the recommendations of the U.S. standard contradict its teachings.

It is important to note that the above critical flow nozzle designs integrate the critical flow nozzle as well as the gas conditioning structure, e.g., the flow straightener/heat exchanger elements, and the pressure measurement and temperature measurement probe arrangements all into a single assembly including a relatively large body 2 having a very high thermal inertia or thermal mass. The high thermal mass assures slow evolution of the temperature of the complete assembly, including the passage upstream of the nozzle and the nozzle itself, at maximum flow when the incoming gas temperature is different from ambient temperature. The high thermal mass is designed so that the temperature evolution of the assembly is less than 0.1 degree Centigrade per second while the mass of the assembly completes the transition to a new temperature equilibrium between the incoming gas temperature and ambient temperature when incoming gas at a temperature 5 degrees Centigrade different from ambient temperature is caused to flow into the assembly. When the temperature of the complete assembly reaches temperature equilibrium, the body temperature is less than 1 degree Centigrade from the temperature of the gas at maximum flow. Therefore, there is no significant heat exchange between the gas and the body as the gas travels from the temperature probe to the nozzle, and the measured temperature can be assumed to be the temperature of the nozzle for use in calculation of the change in dimensions of the nozzle with temperature. This is done in order to maximize the reproducibility/stability of the disclosed mass flow meters by eliminating the contribution of the setup latitudes defined by the U.S. standard that normally are left at the discretion of the user or designer. It should be noted that the integration mentioned above is done primarily to achieve very precise repeatability/stability of the mass flow measurements, rather than to achieve absolute accuracy thereof, since the critical flow nozzle mass flow meters of the present invention are to be calibrated with precision references flow standards, e.g., gravimetric standards. For example, the mass flow meter can be combined with the pressure transducers and the ohmic measurement system used to read the temperature probes.

While the invention has been described with reference to several particular embodiments thereof, those skilled in the art will be able to make the various modifications to the described embodiments of the invention without departing from the true spirit and scope of the invention. It is intended that all elements or steps which are insubstantially different or perform substantially the same function in substantially the same way to achieve the same result as what is claimed are within the scope of the invention.

For example, although the above described embodiments use critical flow nozzles with a toroidal profile for the conversion part of the nozzle and throat profile, the invention also applies to mass flow meters using critical flow nozzles with other than toroidal profiles, such as cylindrical throat or a variable inlet profiles.

Also, the above described technique of including the components of the mass flow meter assembly, including the heat exchanger, the flow straightener, the nozzle, the temperature probes, the upstream and downstream pressure connectors, and the high thermal mass body all in a single assembly can produce the benefit of greatly improved reproducibility of mass flow measurements when the mass flow rate through the nozzle is less than the critical flow rate or sonic flow rate. In this case however, the above equations do not govern the mass flow rate. Instead, the mass flow is proportional to the square root of the product of the density of the gas upstream of the nozzle times the differential pressure across the nozzle. Therefore, other equations can be used. Such equations can be used to compute the mass flow rate on the basis of the upstream pressure and upstream temperature of the gas, the difference between the upstream pressure of the gas and the pressure of the gas in the channel downstream from the nozzle, and the throat diameter of the nozzle.

What is claimed is:

1. A method for measuring gas flow, comprising:
   (a) providing an integrated unit including
      i. an elongated fluid flow channel extending through a high thermal mass body,
      ii. a nozzle in a downstream portion of the channel in close thermal contact with the high thermal mass body,
      iii. a heat exchanger in an upstream portion of the channel in close thermal contact with the high thermal mass body,
      iv. structure associated with the heat exchanger for straightening flow of gas in the upstream portion of the channel,
      vi. a temperature probe associated with the upstream portion of the channel, a pressure probe in the upstream portion of the channel, and a pressure probe downstream from the nozzle;
   (b) forcing gas to flow into an upstream portion of the channel and through the gas straightening structure and the heat exchanger to ensure flow of the gas through the nozzle, wherein the heat exchanger brings a temperature of gas emerging from the heat exchanger close to a temperature of the high thermal mass body;
   (c) measuring a pressure of the gas in the upstream portion of the channel, and measuring a pressure of the gas in the channel downstream from the nozzle;
   (d) determining a temperature of gas upstream from the nozzle; and
   (e) computing the mass flow rate of gas through the nozzle from the upstream pressure and upstream temperature of the gas, the difference between the pressure of the gas in the upstream portion of the channel and the pressure of the gas in the channel downstream from the nozzle, and a throat diameter of the nozzle.

2. A method for measuring gas flow, comprising:
   (a) providing an integrated unit including
      i. an elongated fluid flow channel extending through a high thermal mass body,
      ii. a critical flow nozzle in a downstream portion of the channel,
      iii. a heat exchanger in an upstream portion of the channel in close thermal contact with the high thermal mass body,
      iv. structure associated with the heat exchanger for straightening flow of gas in the upstream portion of the channel,
      vi. a temperature probe associated with the upstream portion of the channel, a pressure probe in the upstream portion of the channel, and a pressure probe downstream from the critical flow nozzle;
   (b) forcing gas to flow into an upstream portion of the channel and through the gas straightening structure and the heat exchanger at a sufficiently high pressure to ensure critical flow of the gas through the critical flow nozzle, wherein the heat exchanger brings a temperature of gas emerging from the heat exchanger close to a temperature of the high thermal mass body;
   (c) measuring a pressure of the gas in the upstream portion of the channel;
   (d) determining a temperature of gas emerging from the heat exchanger upstream from the critical flow nozzle by means of the temperature probe; and
   (e) computing the mass flow rate of gas through the critical flow nozzle from the upstream pressure, the temperature of the gas emerging from the heat exchanger, and a throat diameter of the critical flow nozzle.

3. The method of claim 2 including computing an amount of deformation of a diameter of the throat of the critical flow nozzle due to the pressure of upstream gas in the channel and using the amount of deformation in performing step (e) to correct the throat diameter in the computing of the mass flow rate of the gas through the critical flow nozzle.

4. The method of claim 2 including computing an amount of deformation of a diameter of a throat of the critical flow nozzle due to a change in the temperature of the high thermal mass body in performing step (e) to correct the throat diameter in computing the mass flow rate of the gas through the critical flow nozzle.

5. The method of claim 2 including computing an amount of deformation of a diameter of a throat of the critical flow nozzle due to a change in the temperature of the gas flowing through the critical flow nozzle in performing step (e) to correct the throat diameter in computing the mass flow rate of the gas through the critical flow nozzle.

6. The method of claim 2 including producing a near-vacuum pressure downstream from the critical nozzle to decrease a lower limit of the pressure of gas in the upstream portion of the channel at which the critical flow of the gas through the critical flow nozzle is ensured.

7. A device for measuring gas flow, comprising:
   (a) an integrated unit including
      i. an elongated fluid flow channel extending through a high thermal mass body,
      ii. a critical flow nozzle in a downstream portion of the channel,
      iii. a heat exchanger in an upstream portion of the channel in close thermal contact with the high thermal mass body, iv. a flow straightener associated with the upstream portion of the channel, vi. a temperature probe in the upstream portion of the channel, a pressure probe in the upstream portion of the channel, and a pressure probe downstream from the critical flow nozzle;

(b) means for forcing gas to flow into an upstream portion of the channel and through the heat exchanger at a sufficiently high pressure to ensure critical flow of the gas through the critical flow nozzle, wherein the heat exchanger brings a temperature of gas emerging from the heat exchanger close to a temperature of the high thermal mass body;

(c) means for measuring a pressure of the gas in the upstream portion of the channel;

(d) means, including the temperature probe, for determining a temperature of gas emerging from the heat exchanger upstream from the critical flow nozzle; and (e) means for computing the mass flow rate of gas through the critical flow nozzle from the upstream pressure, the temperature of the gas emerging from the heat exchanger, and a throat diameter of the critical flow nozzle.

8. The device of claim 7 including means for computing an amount of deformation of a diameter of the throat of the critical flow nozzle due to the pressure of upstream gas in the channel and using the amount of deformation to correct the throat diameter in the computing of the mass flow rate of the gas through the critical flow nozzle.

9. The device of claim 7 including means for computing an amount of deformation of a diameter of a throat of the critical flow nozzle due to a change in the temperature of the high thermal mass body to correct the throat diameter in computing the mass flow rate of the gas through the critical flow nozzle.

10. The device of claim 7 including means for computing an amount of deformation of a diameter of a throat of the critical flow nozzle due to a change in the temperature of the gas flowing through the critical flow nozzle to correct the throat diameter in computing the mass flow rate of the gas through the critical flow nozzle.

11. A device for measuring gas flow, comprising:

(a) an elongated fluid flow channel extending through a high thermal mass body;

(b) a critical flow nozzle in a downstream portion of the channel;

(c) a heat exchanger in an upstream portion of the channel in close thermal contact with the high thermal mass body;

(d) a flow straightener in the upstream portion of the channel;

(e) a temperature probe associated with the upstream portion of the channel, a pressure probe in the upstream portion of the channel, and a pressure probe downstream from the critical flow nozzle; and (f) means for forcing gas to flow into an upstream portion of the channel and through the heat exchanger at a sufficiently high pressure to ensure critical flow of the gas through the critical flow nozzle, wherein the heat exchanger brings a temperature of gas emerging from the heat exchanger close to a temperature of the high thermal mass body.

12. The device of claim 11 including means for computing an amount of deformation of a diameter of the throat of the critical flow nozzle due to the pressure of upstream gas in the channel and using the amount of deformation to correct the throat diameter in the computing of the mass flow rate of the gas through the critical flow nozzle.

13. The device of claim 11 including means for computing an amount of deformation of a diameter of a throat of the critical flow nozzle due to a change in the temperature of the high thermal mass body too correct the throat diameter in computing the mass flow rate of the gas through the critical flow nozzle.

14. The device of claim 11 including means for computing an amount of deformation of a diameter of a throat of the critical flow nozzle due to a change in the temperature of the gas flowing through the critical flow nozzle to correct the throat diameter in computing the mass flow rate of the gas through the critical flow nozzle.

15. The device of claim 11 wherein the gas flow straightening structure is integral with the heat exchanger.

16. A method for measuring gas flow, comprising:

(a) providing an elongated fluid flow channel extending through a high thermal mass body;

(b) providing a critical flow nozzle in a downstream portion of the channel;

(c) providing a heat exchanger in the upstream portion of the channel in close thermal contact with the high thermal mass body;

(d) forcing gas to flow into an upstream portion of the channel and through the heat exchanger at a sufficiently high pressure to ensure critical flow of the gas through the critical flow nozzle, the heat exchanger bringing a temperature of gas emerging from the heat exchanger to a value essentially equal to a temperature of the high thermal mass body;

(e) measuring a pressure of the gas in the upstream portion of the channel and ensuring that the pressure of the gas in the upstream portion of the channel sufficiently exceeds a pressure of the gas downstream from the critical flow nozzle to ensure sonic flow of the gas through the critical flow nozzle;

(f) measuring a temperature of a portion of the high thermal mass body adjacent to the upstream portion of the channel; and (g) computing the mass flow rate of gas through the critical flow nozzle from the upstream pressure, temperature of the high thermal mass body, and a dimensional characteristic of the critical flow nozzle.

17. The method of claim 16 including computing an amount of deformation of a diameter of a throat of the critical flow nozzle due to the pressure of upstream gas in the channel and using the amount of deformation in performing step (g) to correct the throat diameter in the computing of the mass flow rate of the gas through the critical flow nozzle.

18. The method of claim 16 including computing an amount of deformation of a diameter of a throat of the critical flow nozzle due to a change in the temperature of the high thermal mass body in performing step (g) to correct the throat diameter in computing the mass flow rate of the gas through the critical flow nozzle.

19. The method of claim 16 including computing an amount of deformation of a diameter of a throat of the critical flow nozzle due to a change in the temperature of the gas flowing through the critical flow nozzle in performing step (g) to correct the throat diameter in computing the mass flow rate of the gas through the critical flow nozzle.

20. The method of claim 16 wherein step (g) includes computing the mass flow rate according to the expression $$q_m = A^*(C)(C^*)(P)/[(R/M).T]^{1/2},$$

where
- $q_m$ is the mass flow of the gas,
- A* is the cross-sectional area of the Venturi nozzle throat,
- C is the discharge coefficient,
- C* is the critical flow function of a real gas at the nozzle throat,
- P is the absolute upstream pressure measured at the pressure connection,
- T is the average absolute upstream temperature measured by the two temperature probes,
- R is the universal gas constant,
- M is the molar mass, with $$A^* = \pi d^2/4[1+2\alpha(T-293.15)]\cdot(1+\lambda P),$$

where
- d is the diameter of the Venturi nozzle throat,
- $\alpha$ is the linear coefficient of thermal expansion of the nozzle material,
- $\lambda$ is the deformation coefficient of the nozzle throat with the upstream pressure, with $$C = a - b\, Re_d^{-n},$$

where
- a, b, n, are coefficients determined experimentally from gravimetric calibration,
- $Re_d$ is the Reynolds number at the nozzle throat, with C*=values of the critical flow function for various real gases as a function of P and T, with $$Re_d = 4q_m/\pi d\mu,$$

where
- $\mu$ is the dynamic viscosity of the gas in P,T conditions.

21. The method of claim 16 wherein step (a) includes providing an elongated, cylindrical fluid flow channel.

22. The method of claim 16 including causing the flow of the gas into the channel to be in the range from 100 standard cubic centimeters per minute to approximately 100 standard liters per minute.

23. The method of claim 16 including providing a flow straightener in the upstream portion of the channel.

24. The method of claim 23 including providing the flow straightener integrally with the heat exchanger.

25. The method of claim 24 including providing an integral heat flow straightener including a plurality of holes with holes radially oriented about the flow channel.

26. The method of claim 24 including providing an integral heat exchanger including a shaft and a cylinder forming a longitudinal annular flow path along a longitudinal axis of the cylinder.

27. The method of claim 24 to wherein the longitudinal axis coincides with a longitudinal axis of the critical flow nozzle.

28. The method of claim 16 including providing a programmable read-only memory unit for storing information for use in computing the mass flow rate for different gases through the critical flow nozzle.

29. The method of claim 28 including computing the mass flow rate through the critical flow nozzle using values of discharge coefficients that have been experimentally determined for each gas type.

30. The method of claim 16 wherein the diameter of a passage through the critical flow nozzle is in the range from approximately 0.2 millimeters to approximately 2 millimeters.

31. The method of claim 30 wherein the heat exchanger is located less than 5 times the diameter of the channel upstream of the nozzle from an upstream face of the critical flow nozzle.

32. The method of claim 16 wherein the flow rate of the gas through the channel is sufficiently low that the temperature of the gas emerging from the heat exchanger is essentially equal to the temperature of the high thermal mass body.

33. A method for measuring gas flow, comprising:
   (a) providing an elongated fluid flow channel extending through a high thermal mass body;
   (b) providing a critical flow nozzle in a downstream portion of the channel;
   (c) providing a heat exchanger in the upstream portion of the channel in close thermal contact with the high thermal mass body;
   (d) forcing gas to flow into an upstream portion of the channel and through the heat exchanger at a sufficiently high pressure to ensure critical flow of the gas through the critical flow nozzle, the heat exchanger bringing a temperature of gas emerging from the heat exchanger close to a temperature of the high thermal mass body;
   (e) measuring a pressure of the gas in the upstream portion of the channel, and ensuring that the pressure of the gas in the upstream portion of the channel sufficiently exceeds a pressure of the gas downstream from the critical flow nozzle to ensure sonic flow of the gas through the critical flow nozzle;
   (f) measuring a temperature of gas emerging from the heat exchanger upstream from the critical flow nozzle; and
   (g) computing the mass flow rate of gas through the critical flow nozzle from the upstream pressure, the temperature of the gas, and a dimensional characteristic of the critical flow nozzle.

34. The method of claim 33 including computing an amount of deformation of a diameter of a throat of the critical flow nozzle due to the pressure of upstream gas in the channel and using the amount of deformation in performing step (g) to correct the throat diameter in the computing of the mass flow rate of the gas through the critical flow nozzle.

35. The method of claim 33 including computing an amount of deformation of a diameter of a throat of the critical flow nozzle due to a change in the temperature of the high thermal mass body in performing step (g) to correct the throat diameter in computing the mass flow rate of the gas through the critical flow nozzle.

36. The method of claim 33 including computing an amount of deformation of a diameter of a throat of the critical flow nozzle due to a change in the temperature of the gas flowing through the critical flow nozzle in performing step (g) to correct the throat diameter in computing the mass flow rate of the gas through the critical flow nozzle.

37. The method of claim 33 wherein step (g) includes computing the mass flow rate, using values of discharge coefficients that have been experimentally determined for each gas type, according to the expression $$q_m = (A^*)(C)(C^*)(P)/[(R/M)\cdot T]^{1/2},$$

where
- $q_m$ is the mass flow of the gas,
- A* is the cross-sectional area of the Venturi nozzle throat,
- C is the discharge coefficient,
- C* is the critical flow function of a real gas at the nozzle throat,
- P is the absolute upstream pressure measured at the pressure connection, T is the average absolute upstream temperature measured by the two temperature probes, R is the universal gas constant, M is the molar mass, with $$A^* = \pi d^2/4[1+2\alpha(T-293.15)](1+\lambda P),$$

where d is the diameter of the Venturi nozzle throat, $\alpha$ is the linear coefficient of thermal expansion of the nozzle material, $\lambda$ is the deformation coefficient of the nozzle throat with the upstream pressure, with $$C = a - b\, Re_d^{-n},$$

where a, b, n, are coefficients determined experimentally from gravimetric calibration, $Re_d$ is the Reynolds number at the nozzle throat, with $C^*$ = values of the critical flow function for various real gases as a function of P and T, with $$Re_d = 4q_m/\pi d\mu,$$

where $\mu$ is the dynamic viscosity of the gas in P,T conditions.

38. The method of claim 33 wherein step (a) includes providing an elongated, cylindrical fluid flow channel.

39. The method of claim 33 including causing the flow of the gas into the channel to be in the range from 5 standard liters per minute to approximately 5000 standard liters per minute.

40. The method of claim 33 including providing a flow straightener in the upstream portion of the channel.

41. The method of claim 40 including providing the flow straightener integrally with the heat exchanger.

42. The method of claim 41 including providing an integral flow straightener/heat exchanger including a plurality of flat vanes radially oriented about a longitudinal axis which is parallel to a longitudinal axis of the channel.

43. The method of claim 42 including providing the flow straightener/heat exchanger so that the longitudinal axis coincides with a longitudinal axis of the critical flow nozzle.

44. The method of claim 33 including providing a programmable read-only memory unit for storing information for use in computing the mass flow rate through the critical flow nozzle using values of discharge coefficient that have been experimentally determined for each gas type.

45. The method of claim 44 including computing the mass flow rate through the critical flow nozzle using measured pressure, measured temperature and a dimensional characteristic of the critical flow nozzle.

46. The method of claim 33 wherein a minimum diameter of a passage through the critical flow nozzle is in the range from approximately 1 millimeter to approximately 10 or more millimeters.

47. The method of claim 46 wherein the heat exchanger is located less than 5 times the diameter of the channel upstream of the nozzle from an upstream face of the critical flow nozzle.

48. The method of claim 33 including computing an amount of deformation of a diameter of a throat of the critical flow nozzle due to the pressure of upstream gas in the channel and using the amount of deformation to correct the throat diameter in computing the mass flow rate of the gas through the critical flow nozzle.

49. A device for measuring gas flow, comprising:

(a) an elongated fluid flow channel extending through a high thermal mass body;

(b) a critical flow nozzle in a downstream portion of the channel;

(c) a heat exchanger in the upstream portion of the channel in close thermal contact with the high thermal mass body;

(d) a gas source forcing gas to flow into an upstream portion of the channel and through the heat exchanger at a sufficiently high pressure to ensure critical flow of the gas through the critical flow nozzle, the heat exchanger bringing a temperature of gas emerging from the heat exchanger to a value essentially equal to a temperature of the high thermal mass body;

(e) a first pressure transducer connected in fluid communication with the upstream portion of the channel to measure a pressure of the gas in the upstream portion of the channel;

(f) a temperature transducer connected to measure a temperature of a portion of the high thermal mass body adjacent to the upstream portion of the channel; and (g) a processor programmed for computing the mass flow rate of gas through the critical flow nozzle from the upstream pressure, temperature of the high thermal mass body, and a dimensional characteristic of the critical flow nozzle.

50. The device of claim 49 including means for computing an amount of deformation of a diameter of a throat of the critical flow nozzle due to the pressure of upstream gas in the channel and using the amount of deformation to correct the throat diameter in the computing of the mass flow rate of the gas through the critical flow nozzle.

51. The device of claim 49 including means for computing an amount of deformation of a diameter of a throat of the critical flow nozzle due to a change in the temperature of the high thermal mass body to correct the throat diameter in computing the mass flow rate of the gas through the critical flow nozzle.

52. The system of claim 49 including means for computing an amount of deformation of a diameter of a throat of the critical flow nozzle due to a change in the temperature of the gas flowing through the critical flow nozzle to correct the throat diameter in computing the mass flow rate of the gas through the critical flow nozzle.

53. The device of claim 49 including means for ensuring that the pressure of the gas in the upstream portion of the channel sufficiently exceeds a pressure of the gas downstream from the critical flow nozzle to ensure sonic flow of the gas through the critical flow nozzle.

54. A device for measuring gas flow, comprising:

(a) an elongated fluid flow channel extending through a high thermal mass body;

(b) a critical flow nozzle in a downstream portion of the channel;

(c) a heat exchanger in the upstream portion of the channel in close thermal contact with the high thermal mass body;

(d) a gas source forcing gas to flow into an upstream portion of the channel and through the heat exchanger at a sufficiently high pressure to ensure critical flow of the gas through the critical flow nozzle, the heat exchanger bringing a temperature of gas emerging from the heat exchanger close to a temperature of the high thermal mass body;

(e) a first pressure transducer connected in fluid communication with the upstream portion of the channel to measure a pressure of the gas in the upstream portion of the channel;

(f) a temperature transducer connected to measure a temperature of gas emerging from the heat exchanger upstream from the critical flow nozzle; and (g) a processor programmed for computing the mass flow rate of gas through the critical flow nozzle from the upstream pressure, the temperature of the gas, and a dimensional characteristic of the critical flow nozzle.

55. The device of claim 54 including means for computing an amount of deformation of a diameter of a throat of the critical flow nozzle due to the pressure of upstream gas in the channel and using the amount of deformation to correct the throat diameter in the computing of the mass flow rate of the gas through the critical flow nozzle.

56. The device of claim 54 including means for computing an amount of deformation of a diameter of a throat of the critical flow nozzle due to a change in the temperature of the high thermal mass body to correct the throat diameter in computing the mass flow rate of the gas through the critical flow nozzle.

57. The device of claim 54 including means for computing an amount of deformation of a diameter of a throat of the critical flow nozzle due to a change in the temperature of the gas flowing through the critical flow nozzle to correct the throat diameter in computing the mass flow rate of the gas through the critical flow nozzle.

58. The device of claim 54 including means for ensuring that the pressure of the gas in the upstream portion of the channel sufficiently exceeds a pressure of the gas downstream from the critical flow nozzle to ensure sonic flow of the gas through the critical flow nozzle.

* * * * *